(No Model.) 2 Sheets—Sheet 1.
J. H. BLESSING & R. R. OSGOOD.
FRICTION CLUTCH.
No. 255,408. Patented Mar. 28, 1882.
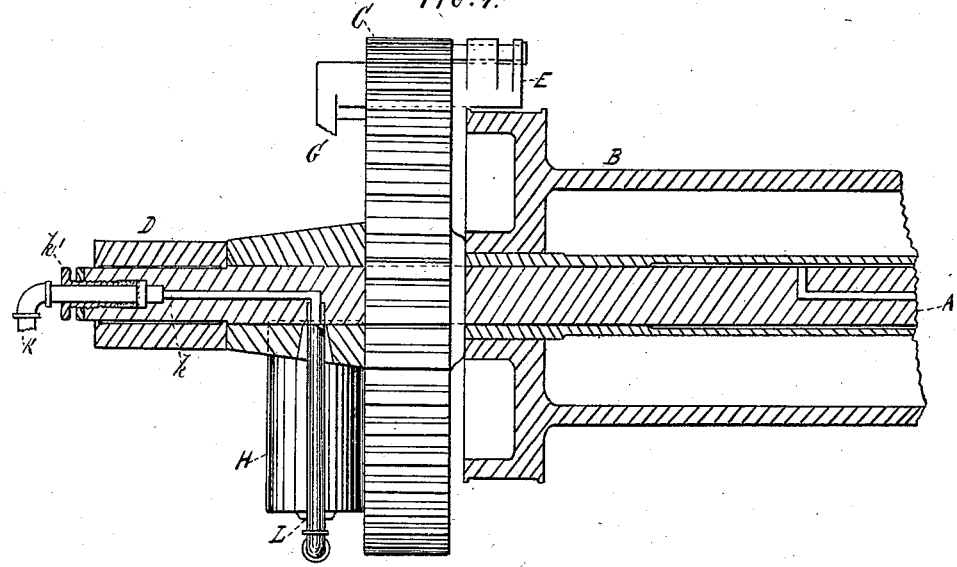
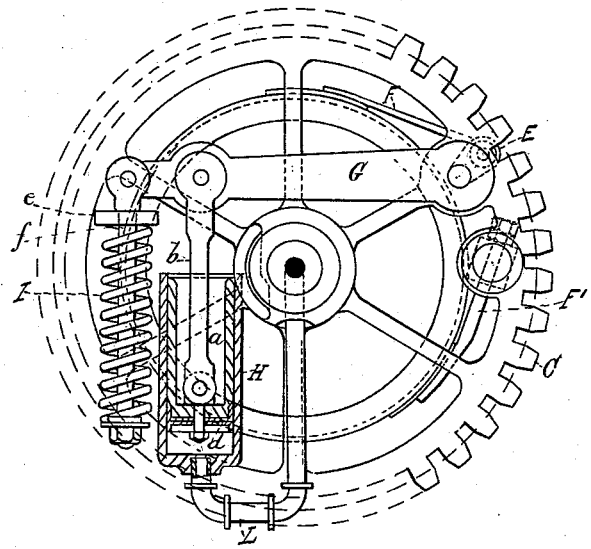

(No Model.) 2 Sheets—Sheet 2.
J. H. BLESSING & R. R. OSGOOD.
FRICTION CLUTCH.
No. 255,408. Patented Mar. 28, 1882.
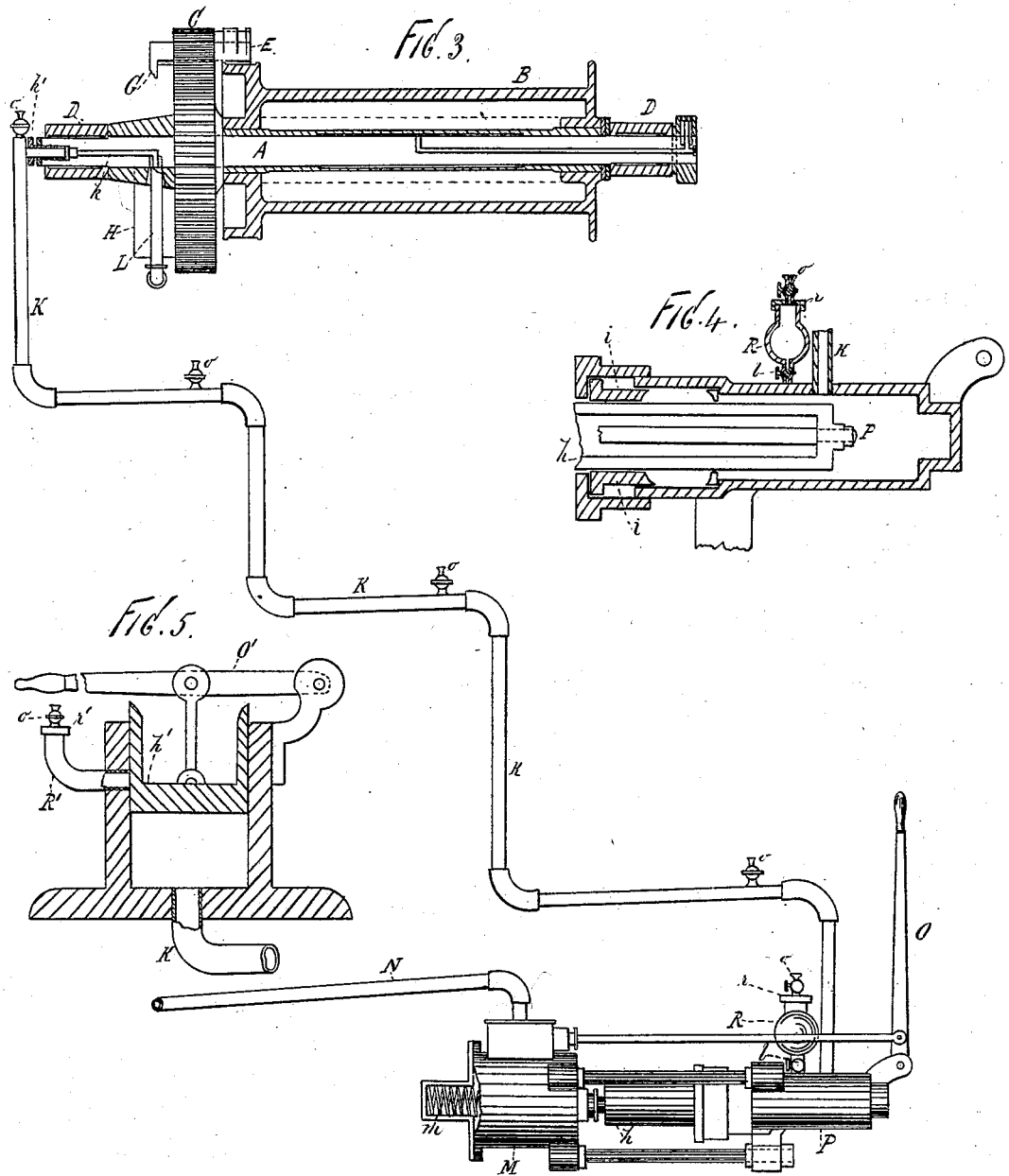

UNITED STATES PATENT OFFICE.

JAMES H. BLESSING, OF ALBANY, AND RALPH R. OSGOOD, OF TROY, N. Y.

FRICTION-CLUTCH.

SPECIFICATION forming part of Letters Patent No. 255,408, dated March 28, 1882.

Application filed January 12, 1882. (No model.)

*To all whom it may concern:*

Be it known that we, JAMES H. BLESSING, of Albany, county of Albany, and State of New York, and RALPH R. OSGOOD, of Troy, county of Rensselaer, and State of New York, have jointly invented certain new and useful Improvements in Friction-Clutches, of which the following is a full, clear, and exact description, reference being had to the accompanying drawings, and to the letters of reference marked thereon.

Our invention has relation to friction-clutches, especially to those which require a considerable power for operating them effectively; but the improvements are applicable to lighter forms of clutches, wherein it may be desired to move the clutching parts quickly, easily, and with certainty, with but little exertion on the part of the operator.

Among the objects of our invention are the application to the clutch of simple, durable, and effective means for moving the clutching mechanism, whereby the movements and the force exerted are placed within the instantaneous control of the operator, requiring but a trifling manual exertion, and a compact arrangement of parts not liable to become damaged or disarranged, easy to be kept in repair and working order, and thoroughly efficient for the purpose of throwing the clutch in or out of gear. To accomplish all of this our improvements involve certain novel and useful arrangements or combinations of parts and principles of operation, all of which will be herein first fully set forth, and then pointed out in the claims.

To illustrate the character and scope of our invention we have shown our improvements as applied in connection with a hoisting-drum of large size, such as are employed upon dredging-machines and for like powerful or heavy work; but it will appear that the improvements may likewise be employed upon lighter drums, and generally in any situation where it may be desired to clutch a revolving shaft and a drum, wheel, pulley, or another shaft.

In the accompanying drawings, forming part of this specification, Figure 1 is a partial section and elevation, showing one end of a drum and a spur-wheel mounted upon a shaft, the pressure-cylinder and the conduit leading to said cylinder being represented in position, the operating-lever being broken away, and the friction-band omitted to facilitate illustration. Fig. 2 is an end elevation of device represented in Fig. 1, the pressure-cylinder being represented in section and the ends of the friction-band in place. Fig. 3 is a partial section and elevation indicating an arrangement in accordance with our invention, showing the pressure-pump and the pipe leading therefrom to the pressure-cylinder, and the application of air-cocks, for purposes to be explained. Fig. 4 is a sectional view showing the construction and arrangement of the pressure-pump, the same being enlarged beyond the corresponding part represented in elevation in Fig. 3. Fig. 5 is a sectional view illustrating a convenient form of hand-pump which may be employed instead of the power-pump shown in Figs. 3 and 4.

In all these figures like letters of reference, wherever they occur, indicate corresponding parts.

A is the shaft of the drum, suitably supported in bearings at either end, and made to revolve by the driving-power.

B is a drum for the reception of a chain, cord, or cable, which drum it is desired to couple with the revolving shaft or to uncouple therefrom, according to the work to be done.

C is a spur-wheel connected with the shaft, which in the arrangements shown in the drawings receives motion from a suitable pinion meshing therewith, and communicates motion to the shaft A; but the means employed for driving the shaft may be of any other character, and it is not necessary for the successful operation of our improvements that the shaft extend through the drum, as shown. The driving-shaft and the drum-shaft might be independent of each other.

D D represent the bearings or supports for the shaft A.

E is a short powerful lever projecting through the wheel C, (being suitably journaled therein,) and holding one end, F, of the friction-band. The other end, F', of this band is attached to a projection upon the wheel C, and the band is made to envelop the drum-head.

The band and the method of mounting it are not of our joint invention; but a consideration of the illustration will show that by tightening or loosening the band the drum is clutched with or unclutched from the moving shaft. The power required to strain this band sufficiently to produce the requisite amount of friction in order to make the clutching secure is oftentimes very great, and after having been so strained it frequently requires considerable power to loosen it. Hand-levers sufficiently powerful for the purpose require a long sweep, consuming time to move them, being frequently in the way, and being at times difficult and inconvenient to operate. Upon the end of lever E, I attach a sufficiently long arm or crank, G. This moves parallel with the face of wheel C, and its motions determine the position of the belt.

The pressure-cylinder H is mounted upon and turns with the wheel C. This cylinder is fitted with a hollow piston, $a$, which carries the connecting-rod $b$, hinged to the piston and to arm G, as plainly shown, so as to admit of the required movements. The piston is provided with a double cup-packing, (leather or equivalent,) as at $d$, one part to prevent escape of the pressure-fluid when pressure is applied, and the other part to prevent admission of air from the exterior. When pressure is applied beneath the piston it is moved outwardly, and through the connection shown strain is brought upon the friction-belt, by which the clutching is accomplished. To return the piston to its normal position after the pressure is released, we provide a powerful spring, I, one end of which is connected with arm G and the other with the wheel C. This spring I is shown as arranged so that when the piston is forced outward the spring will be compressed as against stud $e$ through the medium of the central rod, $f$. The spring might be arranged to be extended instead of compressed, in order to instantly return the arm G after the pressure is removed, for which purpose it is always sufficiently powerful. The spring is assisted of course by the atmospheric pressure upon the exterior of the piston. For operating the piston we employ a constant quantity of fluid. This may be water, oil, air, steam, or any other liquid or fluid. (When steam is employed we use a steam-packing in the place of the leather,) which answers when liquids are employed.) Water is preferred, however. The pipe or conduit K supplying this liquid or fluid to the pressure-cylinder communicates with or enters the axis of the shaft, so that the shaft may be turned. We make the channel $k$ in the shaft, and the pipe K communicates with this channel, the joint being made secure by any suitable turning coupling, as by use of the packing-screw $k'$, to keep the joint perfectly secure against escape of pressure-fluid. From the channel $k$ the branch pipe L leads to the under side of the cylinder.

P is the pressure-pump, driven by steam from the main boiler, which enters the cylinder M through pipe N. This pump has a piston, $h$, of smaller diameter than the piston in cylinder M, (so that the power will be multiplied,) and the piston $h$ is packed, as by cup $i$, so as to prevent any leakage. The cylinder M is provided with cushion-springs $m$, and the whole should be well arranged to perform the work intended easily and without shock, though the pump, &c., need not be of the character shown in the drawings, since any effective appliance will answer as well.

A suitable hand-lever, O, controls the admission of steam into cylinder M, and to shift this lever (which may be done very easily and quickly) is all that is necessary to apply any desired power to the clutching mechanism.

The pipe K and the pump and connected channels and branches are filled with a liquid or fluid, preferably water, as before stated. This being of a certain quantity, any pressure upon it through the medium of the pressure-pump will be immediately transmitted to the pressure-cylinder, and thence to the friction appliances.

The pump may be located at any desired distance from the clutch. The connecting-pipe is supplied with air-cocks $o$ $o$ at or near any of the elevations which may be found in the pipe. We have shown this pipe with several bends, in each of which one end is represented as higher than the other, and upon each elevated part an air-cock.

If water or oil or such comparatively inelastic fluid be employed, it is important that the pipe K be kept free from air, and the purpose of the cocks $o$ is to permit the escape of this air, after which the cocks are turned, making the communication between the pump and pressure-cylinder perfectly tight.

Water or other liquid is supplied through the filling-chamber R communicating with the pump-barrel, or with other suitable part of the apparatus. The cock $l$ at the bottom of this chamber is closed, the cap $r$ removed and the liquid introduced, cap replaced, and cock $l$ opened; and when the supply of liquid to the pump and connections is found sufficient the cock may be again closed, preserving a constant supply of the liquid in the apparatus. Other means of filling may be employed. One of the air-cocks $o$ is mounted upon the filling-chamber, or upon the cap thereof, so as to give vent to air, if necessary.

In many instances the great power derived from use of the pump driven by steam from the boiler may not be required. In such cases we provide a simple force-pump to be worked by hand, substantially as shown in Fig. 5. The plunger $h'$ of this pump is operated by the hand-lever O', the pressure from which is communicated to the pressure-piston and thence to the friction-band in a manner readily understood. The power exerted by this hand appliance may be regulated by the relative size of the pump-plunger and pressure-piston, on the same principles as observed in the ordinary hydraulic press.

A filling-pipe, R', leads to the pump-barrel, being supplied with a suitable cap, r', and air-cock, if desired. By elevating the plunger above the mouth of pipe R' liquid may be introduced to the pump-barrel and thence to all the connections.

The hand-pump is easy to operate, and enables the operator to control the clutch with readiness and much less exertion than with the rigid clutching-levers heretofore used.

The drum is shown as mounted upon a sleeve, beneath which is an oil-passage supplied from the exterior; but this is no part of the invention.

When constructed and arranged for operation substantially in accordance with the foregoing explanations, our improvements are found in practice to enable one to operate the clutch with ease, certainty, and celerity. The parts are simple and effective and little liable to get out of order or to require frequent repairs. The clutch may by these improvements be operated from any desired location, and any desired degree of power may be employed. The arrangement is compact and durable, and is peculiarly well adapted for the uses and purposes for which designed.

By employment of a constant quantity of fluid for transmitting the required pressure we obviate the necessity of any provision for discharge-fluid. The fluid is forced into the cylinder by the pressure applied. When the pressure is relieved it follows back in the same channel through which it was supplied.

Having now fully described our invention, what we claim as new herein, and desire to secure by Letters Patent, is—

1. In a friction clutch, a pressure-cylinder mounted upon and turning with the driving-shaft, said cylinder carrying a piston driven by fluid-pressure and connected with the friction-band, substantially as and for the purposes set forth.

2. The conduit for the fluid under pressure, the same entering the axis of the shaft, passing out at an angle with the same, and leading to the bottom of the pressure-cylinder, said cylinder being made to turn with the shaft, substantially as and for the purposes set forth.

3. The pressure-cylinder, made to turn with the shaft, the piston thereof, connected with the arm which regulates tension on the friction-band, and the fluid-pipe, containing a constant supply of fluid and connecting the pump and cylinder, the several parts combined substantially as shown and described.

4. The combination of the pressure-cylinder, the piston therein, connected with the arm which moves the clutch-band, and the retracting-spring applied to said arm, these several parts being mounted and arranged to turn with the shaft, substantially as shown and described.

5. In combination with the fluid-conduit connecting the pressure-pump and the pressure-cylinder, mounted upon and turning with the axle, the air-cocks, arranged, substantially as shown, so as to relieve the pipe or conduit, in the manner and for the purposes set forth.

6. The combination of the arm or lever connected with the friction-band, the pressure-cylinder and its piston, the coupling-rod, the retracting-spring, the supply-pipe or conduit leading through the shaft of the drum to the bottom of the pressure-cylinder, and the pressure-pump, all combined and arranged to operate substantially as herein shown and described.

In testimony that we claim the foregoing we have hereunto set our hands in the presence of two witnesses.

JAMES H. BLESSING.
RALPH R. OSGOOD.

Witnesses:
WILLIAM LACY.
FRED B. HUBBARD.